United States Patent [19]
Brezinski et al.

[11] Patent Number: 5,674,817
[45] Date of Patent: Oct. 7, 1997

[54] CONTROLLING IRON IN AQUEOUS WELL FRACTURING FLUIDS

[75] Inventors: Michael M. Brezinski; Tommy R. Gardner; Weldon M. Harms; James L. Lane, Jr.; Karen L. King, all of Duncan, Okla.

[73] Assignee: Halliburton Energy Services, Inc., Duncan, Okla.

[21] Appl. No.: 949,659

[22] Filed: Nov. 19, 1992

[51] Int. Cl.$^6$ ........................................... E21B 43/00
[52] U.S. Cl. ........................................... 507/258; 507/933
[58] Field of Search ............... 252/8.551; 507/258, 507/933

[56] References Cited

U.S. PATENT DOCUMENTS

| | | | |
|---|---|---|---|
| 4,537,684 | 8/1985 | Gallup et al. | 210/696 |
| 4,633,949 | 1/1987 | Crowe | 166/279 |
| 4,683,954 | 8/1987 | Walker et al. | 166/307 |
| 4,888,121 | 12/1989 | Dill et al. | 252/8.553 |
| 5,073,270 | 12/1991 | Gallup et al. | 210/698 |

*Primary Examiner*—Gary Geist
*Attorney, Agent, or Firm*—Robert A. Kent; C. Clark Dougherty, Jr.

[57] ABSTRACT

Methods and compositions for controlling iron in aqueous well fracturing fluids are disclosed. In accordance with the methods, ferric iron contained in a fracturing fluid is prevented from precipitating or otherwise disadvantageously reacting by adding a thioalkyl acid or derivative thereof to the fracturing fluid. The thioalkyl acid or derivative reduces ferric ion to ferrous ion which remains in solution at pH levels below about 7.5.

18 Claims, No Drawings

CONTROLLING IRON IN AQUEOUS WELL FRACTURING FLUIDS

BACKGROUND OF THE INVENTION

1. Field of the Invention

This invention broadly relates to fracturing subterranean well formations to stimulate the production of oil and/or gas therefrom, and more particularly, to controlling iron in aqueous well fracturing fluids to prevent the formation of iron precipitates therein as well as to prevent other undesirable iron reactions.

2. Description of the Prior Art

The stimulation of oil and/or gas production from subterranean formations by fracturing the formations is well known to those skilled in the art. Generally, a fracturing procedure is carried out by pumping a fracturing fluid into the formation at a rate and pressure such that the formation is hydraulically fractured. The fractures are extended in the formation by continued introduction of fracturing fluid therein, and the fractures so formed are often propped open by propping agent, e.g., sand, deposited therein. Also, depending upon the type of rock making up the formation, the fracture faces can be etched with acid to form flow channels therein. Once the fractures have been formed, propping agent has been deposited therein and/or flow channels have been formed in the faces of the fractures, the hydraulic pressure exerted on the formation is released which causes the fracturing fluid to reverse flow out of the formation and the fractures to close leaving permeable passages therein through which oil and/or gas flows from the formation to the well bore.

A problem which can be encountered if the fracturing fluid contains dissolved iron is the precipitation of iron compounds such as ferric hydroxide therefrom. Such precipitate can plug or reduce the permeability of the fractured formation whereby the fracturing procedure results in a reduction of oil and/or gas production instead of an increase of such production.

Another problem which can be caused by the presence of dissolved iron in a fracturing fluid comprised of a gelled aqueous polymer solution is the undesirable ferric ion cross-linking of the hydrated polymer whereby the viscosity of the fracturing fluid is undesirably increased and/or inconsistent.

While iron precipitate control additives have been developed and used heretofore, the presence of such additives in viscosified aqueous fracturing fluids can significantly hasten the destruction of the viscosifying hydrated polymer in the fluids and prevent or impede the successful completion of a fracturing procedure.

By the present invention, improved methods of controlling iron in an aqueous fracturing fluid and improved aqueous fracturing fluid compositions are provided whereby ferric ion in a fracturing fluid is reduced to ferrous ion which remains in the fracturing fluid without precipitates being produced therefrom.

SUMMARY OF THE INVENTION

The present invention provides methods and aqueous well fracturing compositions which overcome the shortcomings of the prior art. By the methods of the invention, iron contained in an aqueous fracturing fluid having a pH below about 7.5 is controlled by adding a ferric ion reducing agent to the fracturing fluid in an amount sufficient to prevent the precipitation of ferric compounds or the undesirable cross-linking of polymer in the fracturing fluid. Also, the ferric ion reducing agents of this invention generally do not bring about fracturing fluid viscosity loss to as great a degree as prior art iron control agents used heretofore. The term "controlling" and similar terms when used herein in relation to iron contained in a fracturing fluid mean that ferric iron is reduced to ferrous iron and the pH of the fracturing fluid is maintained below about 7.5 whereby ferrous iron precipitates are not formed.

The compositions of this invention are comprised of an aqueous solution and a ferric ion reducing agent present in the solution in an amount sufficient to reduce ferric ion contained therein to ferrous ion. The compositions may also contain one or more buffering agents to maintain the pH of the fracturing fluid below about 7.5.

The ferric ion reducing agent of this invention is a thioalkyl acid or derivative having the general formula:

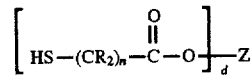

wherein n is an integer in the range of from 1 to 10, Z is selected from R and M, R is hydrogen, —$CH_2COOH$, —$(CH_2)_xCH_3$ or —$(CH_2)_xC_6H_5$ wherein x is an integer in the range of from 0 to 6, M is sodium, potassium, ammonium, calcium, magnesium or $H_3N^+OH$ and d is 1 when Z is R, or d is 1 or 2 when Z is M depending on the valance of M.

It is, therefore, a general object of the present invention to provide methods of controlling iron in aqueous fracturing fluids and aqueous fracturing fluid compositions wherein dissolved iron is controlled so that undesirable iron reactions are prevented.

Other and further objects, features and advantages of the present invention will be readily apparent to those skilled in the art upon a reading of the description of preferred embodiments which follows.

DESCRIPTION OF PREFERRED EMBODIMENTS

As mentioned above, this invention provides methods of controlling iron in an aqueous fracturing fluid utilized in fracturing a subterranean formation penetrated by a well bore whereby ferric iron reactions which produce precipitate or other undesirable results do not take place. Ferric iron can find its way into aqueous fracturing fluids in various ways, the most common of which are by way of the water used in forming the fracturing fluid or by the reaction of the formed fracturing fluid with iron containing compounds in the formation being fractured. When ferric iron (+3 oxidation state) exists in the fracturing fluid it starts to form ferric hydroxide precipitate when the pH of the fluid increases to about 2.5, and it is completely precipitated when the pH reaches about 3.5. Ferrous iron (+2 oxidation state) on the other hand, remains in solution to a pH up to about 7.5.

The methods of the present invention for controlling iron in an aqueous fracturing fluid having a pH below about 7.5 basically comprise adding a ferric ion reducing agent to the fracturing fluid in an amount sufficient to reduce ferric ion contained therein to ferrous ion.

The fracturing fluid compositions of this invention are basically comprised of an aqueous solution, e.g., a gelled aqueous polymer solution or a cross-linked gelled aqueous polymer solution, and a ferric ion reducing agent present in the solution in an amount sufficient to reduce ferric ion contained in or subsequently dissolved in the composition to ferrous ion. The compositions may also include one or more buffering agents to help maintain the pH of the fracturing fluid below about 7.5, preferably in the pH range of from about 1 to about 5. In addition, the compositions can include one or more other agents often added to well treatment fluids including additives for removing oxygen therefrom. Also, when the formation being fractured contains reactive sulfides, the fracturing fluid can include one or more agents for preventing the precipitation of ferrous sulfide.

The ferric ion reducing agent of this invention which reduces ferric ion to ferrous ion and thereby prevents the formation of ferric iron precipitates and other undesirable ferric ion reactions is comprised of a thioalkyl acid or a derivative thereof represented by the following general formula:

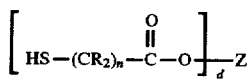

wherein n is an integer in the range of from 1 to 10, Z is selected from R and M, R is hydrogen, $-(CH_2)_xCH_3$, $-CH_2COOH$ or $-(CH_2)_xC_6H_5$ wherein x is an integer in the range of from 0 to 6, M is sodium, potassium, ammonium, calcium, magnesium or a hydroxylammonium cation ($H_3N^+OH$), and d is 1 when Z is R, or d is 1 or 2 when Z is M depending on the valance of M.

A preferred ferric iron reducing agent is a compound of the above formula wherein n is 1, d is 1 and Z is R. The most preferred ferric iron reducing agent is thioglycolic acid.

Examples of compounds within the above definition in addition to thioglycolic acid are α-methylthioglycolic acid, methylthioglycolate, α,α-dimethylthioglycolic acid, α-phenylthioglycolic acid, methyl-α-methylthioglycolate, benzylthioglycolate, α-benzylthioglycolic acid, ammonium thioglycolate, hydroxylammonium thioglycolate, calcium dithioglycolate, β-thiopropionic acid, methyl-β-thiopropionate, sodium-β-thiopropionate and thiomalic acid.

The amount of ferric ion reducing agent effective to reduce substantially all of the ferric ion contained in or to be contained in a fracturing fluid composition of this invention depends on the temperature of the reduction reaction environment. A satisfactory rate of reduction is provided by an amount of ferric ion reducing agent which will produce the required reduction in about 1 hour. Generally, the ferric ion reducing agent is combined with a fracturing fluid in a minimum amount of about 0.01% by volume of the fracturing fluid to a maximum amount of about 8% by volume of the fracturing fluid.

A variety of aqueous solutions can be utilized for forming the fracturing fluid compositions of this invention. Generally, the aqueous solution is comprised of water having one or more viscosity increasing hydratable polymers dissolved therein. Examples of commonly utilized such polymers are polysaccarides including galactomannan polymers, glucomannan polymers and their derivatives. Typical of such polymers are guar gum and guar derivatives and modified cellulose such as hydroxyethylcellulose, carboxymethylcellulose, xanthan gum and other cellulose derivatives. Synthetic polymers can also be utilized examples of which include polyacrylamides, poly-2-amino-2-methyl propane sulfonic acid and others. The polymer is generally present in the aqueous solution in an amount in the range of from about 0.1% to about 2% by weight of solution to thereby produce a gelled aqueous polymer fluid having an apparent viscosity in the range of from about 2 cp to about 200 cp as determined using a Fann Model 50 viscometer. The particular concentration of the polymer depends upon the conditions of the well to be fractured and other factors well known to those skilled in the art.

As mentioned above, aqueous polymer solutions can be cross-linked to increase their viscosity by adding a cross-linking compound thereto. Typical such cross-linking compounds are organic chelates of titanium, zirconium, aluminum or other multivalent metals. The selection of an appropriate cross-linking compound depends upon the particular polymer used, and the amount of cross-linking compound depends upon the well conditions and other factors. Generally, a cross-linking compound is added to an aqueous polymer solution in an amount in the range of from about 0.0005% to about 1.2% by weight of the solution to produce a cross-linked gelled aqueous polymer fluid having a viscosity in the range of from about 40 cp to about 6000 cp as determined using a Fann Model 50 viscometer.

As mentioned above, the gelled aqueous polymer fracturing fluid and/or gelled aqueous cross-linked polymer fracturing fluid must have a pH below about 7.5 to prevent the precipitation of ferrous compounds therefrom. The pH of the fracturing fluid composition can be adjusted if necessary using acids, buffering agents and mixtures of acids and bases. Preferably, the pH of the fracturing fluid is adjusted to a level in the range of from about 1 to about 5 and a buffering agent selected from the group consisting of carbon dioxide, organic acids, e.g., acetic or formic acid, acid salts, e.g., ammonium bisulfite and inorganic acids, e.g., hydrochloric acid or sulfuric acid is added to the fracturing fluid to maintain the pH within that range. The most preferred buffering agent is formic acid.

Other components and additives that can be combined with the compositions of the present invention include acids, sulfide reactants or scavengers such as aldehydes or ketones, surfactants, corrosion inhibitors, fluid loss additives, biocides, non-emulsifying agents and mutual solvents. Such components and additives are well known to those skilled in the art, and their use depends on the conditions of the subterranean formation to be fractured and other factors.

In order to further illustrate the methods and compositions of the present invention, the following examples are given.

EXAMPLE 1

A quantity of an aqueous treatment fluid recovered from the Antrim Shale formation containing ferric hydroxide precipitate (90 ppm ferric ion) was obtained having a pH of 6.26. The aqueous suspension of ferric hydroxide was divided into samples and various iron control additives including a ferric ion reducing agent of this invention were added to the samples in quantities equivalent to 20 pounds of additive per 1000 gallons of aqueous suspension. The ferric ion reducing agent of the present invention used was thioglycolic acid and the other additives were prior art iron control additives, namely, citric acid, hydroxylamine and the ferric ion reducing composition described in U.S. Pat. No. 4,683,954 issued on Aug. 4, 1987, i.e., a mixture of hydroxylamine hydrochloride, gluconodeltalactone and a catalytic amount of cuprous ion.

The samples containing the additives were heated from ambient to 125° F. over a time period of about 1 hour. None of the prior art additives reacted with the aqueous ferric hydroxide suspension which retained its original opaque orange color. The sample to which the thioglycolic acid was added reacted whereby the ferric ion in the precipitate was reduced to ferrous ion and dissolved. As the reaction took place, the suspension was converted from opaque orange to a clear colorous solution.

EXAMPLE 2

An aqueous fracturing fluid containing a guar gum viscosifying polymer in an amount of about 0.36% by weight of the aqueous polymer solution was prepared having a viscosity of 19.5 cp as determined by a Fann Model 50 viscometer. The polymer solution was divided into two test samples, to one of which was added thioglycolic acid in an amount of 0.05% by weight of the resulting solution. The ferric ion reducing composition described in U.S. Pat. No. 4,683,954 issued on Aug. 4, 1987, i.e., a mixture of hydroxylamine hydrochloride, gluconodeltalactone and a catalytic amount of cuprous ion was added to the other polymer solution sample in an amount of about 0.12% by weight of the resulting solution. The viscosities of the test samples containing the additives were continuously monitored over time after the addition of the additives utilizing a Fann Model 50 viscometer at 300 rpm. The results of the tests are set forth and compared in the Table below.

TABLE

Additive Effect on Fracturing Fluid Viscosity

| Additive | Additive Quantity, % by wt. | Viscosity, cp | | | | | | | | |
|---|---|---|---|---|---|---|---|---|---|---|
| | | Initial | 4 min. | 5 min. | 7 min. | 9 min. | 15 min. | 20 min. | 25 min. | 30 min. |
| Additive of this Invention[1] | 0.36 | 19.5 | 19.5 | 19.0 | 19.0 | 19.0 | 18.5 | 18.5 | 18.0 | 18.0 |
| Prior Art Additive[2] | 0.36 | 19.5 | 19.0 | 18.5 | 18.0 | 17.5 | 15.5 | 14.0 | 12.0 | 11.0 |

[1]Thioglycolic acid
[2]hydroxylamine hydrochloride-gluconodeltalactone-cuprious ion additive of U.S. Pat. No. 4,683,954

From Table I it can be seen that the ferric ion reducing additive of the present invention causes viscosity reduction to a substantially lesser degree than does the prior art additive tested.

Thus, the present invention is well adapted to carry out the objects and attain the ends and advantages mentioned as well as those which are inherent therein. While numerous changes to the invention may be made by those skilled in the art, such changes are encompassed within the spirit of the invention as defined by the appended claims.

What is claimed is:

1. A method of controlling iron in an aqueous fracturing fluid comprising at least one member selected from the group consisting of gelled aqueous polymer solutions, crosslinked gelled aqueous polymer solutions, emulsions and foams containing said gelled aqueous polymer solutions and emulsions and foams containing said crosslinked gelled aqueous polymer solutions having a pH below about 7.5 and containing ferric ions in solution comprising adding a ferric ion reducing agent to said fracturing fluid in an amount sufficient to reduce ferric ion contained therein to ferrous ion, said ferric ion reducing agent being a compound of the general formula:

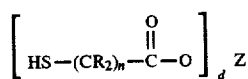

wherein:

n is an integer in the range of from 1 to 10;

Z is selected from R and M;

R is hydrogen, $-(CH_2)_xCH_3$, $-CH_2COOH$ or $-(CH_2)_xC_6H_5$ wherein x is an integer in the range of from 0 to 6;

M is sodium, potassium, ammonium, calcium, magnesium or $H_3N^+OH$; and d is 1 when Z is R, or d is 1 or 2 when Z is M depending on the valance of M.

2. The method of claim 1 wherein said ferric ion reducing agent is added to said aqueous fracturing fluid in an amount in the range of from about 0.01% to about 8% by volume of said fracturing fluid.

3. The method of claim 1 wherein n is 1, d is 1 and Z is R.

4. The method of claim 1 wherein said ferric ion reducing agent is thioglycolic acid.

5. The method of claim 1 wherein said aqueous fracturing fluid is a gelled aqueous polymer solution containing polymer in an amount in the range of from about 0.1% to about 2% by weight of said solution.

6. The method of claim 1 which further comprises adding a buffering agent to said fracturing fluid in an amount sufficient to maintain the pH of said fracturing fluid in the range of from about 1 to about 5.

7. The method of claim 6 wherein said buffering agent is selected from the group consisting of carbon dioxide, organic acids, acid salts and inorganic acids.

8. The method of claim 6 wherein said buffering agent is formic acid.

9. A composition having a pH below about 7.5 for fracturing a subterranean formation wherein ferric ion present in said composition is prevented from reacting to form precipitate or produce other undesirable results comprising:

an aqueous solution comprising at least one member selected from the group consisting of gelled aqueous polymer solutions and crosslinked gelled aqueous polymer solutions; and a ferric ion reducing agent present in said solution in an amount sufficient to reduce said ferric ion to ferrous ion, said ferric ion reducing agent being a compound of the general formula:

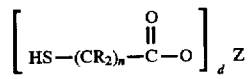

wherein:

n is an integer in the range of from 1 to 10;

Z is selected from R and M;

R is hydrogen, $-(CH_2)_xCH_3$, $-CH_2COOH$ or $-(CH_2)_xC_6H_5$ wherein x is an integer in the range of from 0 to 6;

M is sodium, potassium, ammonium, calcium, magnesium or $H_3N^+OH$; and d is 1 when Z is R, or d is 1 or 2 when Z is M depending on the valance of M.

10. The composition of claim 9 wherein said ferric ion reducing agent is present in said composition in an amount in the range of from about 0.01% to about 8% by volume of said aqueous solution.

11. The composition of claim 9 wherein n is 1, d is 1 and Z is R.

12. The composition of claim 9 wherein said ferric ion reducing agent is thioglycolic acid.

13. The composition of claim 9 which further comprises a buffering agent present in said composition in an amount sufficient to maintain the pH of said composition in the range of from about 1 to about 5.

14. The composition of claim 13 wherein said buffering agent is selected from organic acids, acid salts and inorganic acids.

15. A composition having a pH in the range of from about 1 to about 5 for fracturing a subterranean formation wherein ferric ion present in said composition is prevented from reacting to form precipitate or produce other undesirable results comprising:

an aqueous polymer solution;

thioglycolic acid present in said solution in an amount in the range of from about 0.1% to about 8% by volume of said aqueous polymer solution; and an organic acid buffering agent present in said solution in an amount sufficient to maintain the pH of said solution in the range of from about 1 to about 5.

16. The composition of claim 15 wherein said buffering agent is selected from the group consisting of acetic acid and formic acid.

17. The composition of claim 16 wherein said polymer is selected from the group consisting of guar gum and guar derivatives, cellulose derivatives and synthetic polymers.

18. The composition of claim 9 wherein said polymer is crosslinked with a multivalent metal compound.

* * * * *